United States Patent [19]

Sakata et al.

[11] Patent Number: 5,540,085
[45] Date of Patent: Jul. 30, 1996

[54] METHOD OF MEASURING LEAKAGE POSITION IN IMPERVIOUS BOTTOM SHEET USING ELECTRODES MOUNTED ON BOTH SURFACES OF THE SHEET AND APPARATUS THEREFOR

[75] Inventors: Fumio Sakata; Nobuyoshi Yamazaki; Masaichiro Hatano, all of Tokyo; Hitoshi Arai, Kanagawa; Ken Arai; Masanobu Furukawa, both of Saitama, all of Japan

[73] Assignees: Sakata Denki Co., Ltd; Maeda Corporation, both of Tokyo, Japan

[21] Appl. No.: 346,428

[22] Filed: Nov. 29, 1994

[30] Foreign Application Priority Data

Nov. 30, 1993 [JP] Japan ................................ 5-299693
Mar. 31, 1994 [JP] Japan ................................ 6-063051

[51] Int. Cl.⁶ .................................. G01M 3/16; G01B 7/16
[52] U.S. Cl. .................................. 73/49.2; 73/40; 324/557; 340/605
[58] Field of Search .......................... 73/49.2, 40, 40.7, 73/52; 340/605; 324/72, 557; 405/129

[56] References Cited

U.S. PATENT DOCUMENTS

| | | | |
|---|---|---|---|
| 3,383,863 | 5/1968 | Berry | 340/605 |
| 4,166,244 | 8/1979 | Woods et al. | 340/605 |
| 4,404,516 | 9/1983 | Johnson, Jr. | 324/557 |
| 4,947,470 | 8/1990 | Darilek | 324/557 |
| 5,081,422 | 1/1992 | Shih | 340/605 |
| 5,191,785 | 3/1993 | Kidd et al. | 73/49.2 |
| 5,357,202 | 10/1994 | Henderson | 324/557 |

FOREIGN PATENT DOCUMENTS

| | | | |
|---|---|---|---|
| 205555 | 8/1988 | Japan | 324/557 |
| 136730 | 5/1992 | Japan | 73/40 |
| 136731 | 5/1992 | Japan | 73/40 |
| 136732 | 5/1992 | Japan | 73/40 |
| 5-2699 | 3/1993 | Japan | 73/40 |

*Primary Examiner*—Hezron E. Williams
*Assistant Examiner*—Daniel S. Larkin
*Attorney, Agent, or Firm*—Hopgood, Calimafde, Kalil & Judlowe

[57] ABSTRACT

A method for detecting a leakage position in an impervious sheet, which comprises disposing a first and a second electrode units on an upper side and a lower side of the impervious sheet, respectively, the first electrode unit intersecting with the second electrode unit; short-circuiting all of electrodes in the first electrode unit; selecting a plurality of electrode sets one set after another set in the second electrode unit, each set comprising three electrodes adjacent to each other; supplying an AC voltage from an AC power source across a central one of each electrode set and the short circuited electrodes of the first electrode unit; measuring a potential difference between the other electrodes in the each electrode set to produce a measured voltage signal; and phase-detecting the measured voltage signal with a signal synchronized with the AC voltage from the AC power source to produce a detected signal, a series of the detected signals produced one after another changing in polarity due to a damage existing in the sheet, whereby a first position of the damage being detected on a one dimensional coordinate in an extending direction of the first electrode unit. Thereafter, the similar operation is carried out by replacing the first and the second electrode units by each other to obtain a second position of the damage on a one-dimensional coordinate in an extending direction of the second electrode unit; and defining a two-dimensional position of the damage from the first and the second positions.

9 Claims, 8 Drawing Sheets

METHOD OF MEASURING LEAKAGE POSITION IN IMPERVIOUS BOTTOM SHEET USING ELECTRODES MOUNTED ON BOTH SURFACES OF THE SHEET AND APPARATUS THEREFOR

BACKGROUND OF THE INVENTION

The present invention relates to measurement and detection of a leakage position or positions in an impervious or water-impermeable sheet, and in particular, to that in a impervious bottom sheet mounted in a hole or concavity formed in the land for accumulating or containing a large quantity of waste in a waste disposal site or yard.

In the waste disposal site, the impervious sheet is usually mounted in the bottom of the waste disposal concavity so as to prevent waste from flowing into the ground soil together with water. That is, the sheet is used for preventing water contaminated by waste from flowing out of the site to protect the circumference from contamination or pollution. The contaminated water would pollute the environment, for example, the ground soil and ground water.

In the waste disposal site, the impervious sheet, which is usually made of synthetic resin, rubber, or the like, is often subjected to damages, such as tear or the like, through which the contaminated water flows out or leaks out from the sheet into the ground soil. Leaked water causes a contamination of ground water and a problem of environmental pollution. Therefore, it is required to periodically inspect whether or not any leakage is caused in the impervious sheet. When any leakage position in the sheet is found out in the periodical inspection, it is necessary to repair the damage of the sheet corresponding to the leakage position.

The following conventional methods are used for detecting such a leakage position. In a first method, the impervious sheet is provided with a plurality of first electrodes made of elongated conductive materials extending in parallel with a first direction on the upper side surface or the inner side surface of the sheet, and a plurality of second electrode elements made of elongated conductive materials extending in parallel with a second direction perpendicular to the first direction on the lower side surface or the outer side surface of the sheet. A pair of upper and lower electrodes are selected one after another from the first electrodes and the second electrodes, and an electric voltage is applied across the pair of electrodes selected. Then, an electric current flowing through the pair of electrodes is measured. This is repeated for each of pairs of first and second electrodes selected one after another. When the maximum current is measured for a particular one of pairs of first and second electrodes, it is determined that the damage is located near an intersecting position of the particular one pair of first and second electrodes.

However, in the first conventional method, when there are a plurality of damages in the sheet which are apart from one another by a distance approximately equal to a space between adjacent electrode elements, the maximum current is measured for a plurality of pairs of first and second electrodes. Therefore, the conventional method has a problem that the damaged position is vague.

In another conventional method, the impervious sheet has a plurality of the first electrodes on the upper side surface thereof and a plurality of the second electrodes on the lower side surface thereof, in a similar manner as the first conventional method. By use of two electrode selective-switching circuits for the upper side and for the lower side, an AC voltage is applied to all of pairs of the first and the second electrodes one after another. A current flowing through each of the pairs of electrodes is phase-detected to form a detected output. A difference is obtained between the detected output for one pair of electrodes and that for the next subsequent pair of electrodes. When the difference is inverted in polarity between subsequent pairs, it is determined that the leakage or the damage occurs at a position between the intersections of first and second electrodes of the subsequent pairs. This method was proposed in JP-A-5 52699 by three of the present joint inventors.

In the second conventional methods, electrodes across which a test voltage is applied are also used for measuring a current. Therefore, in use of low frequency AC test voltage, an error is resulted due to an electric double layer formed on the surface of the electrode.

SUMMARY OF THE INVENTION

Accordingly, it is an object of the present invention to provide a method which is able to accurately detect a damaged position in the impervious sheet.

It is another object of this invention to provide a method of detecting a leakage position of the impervious sheet within an early period after occurrence of the leakage.

It is still another object of this invention to provide apparatus for carrying out the above-mentioned methods.

According to the present invention, a method for detecting a leakage position in an impervious sheet is obtained. The method comprises: disposing a first and a second electrode units on an upper side and a lower side of the impervious sheet, respectively, the first electrode unit intersecting with the second electrode unit; short-circuiting all of electrodes in the first electrode unit; selecting a plurality of electrode sets one set after another set in the second electrode unit, each set comprising three electrodes adjacent to each other; supplying an AC voltage from an AC power source across a central one of each electrode set and the short-circuited electrodes of the first electrode unit; measuring a potential difference between the other electrodes in the each electrode set to produce a measured voltage signal; and phase-detecting the measured voltage signal with a signal synchronized with the AC voltage from the AC power source to produce a detected signal, a series of the detected signals produced one after another changing in polarity due to a damage existing in the sheet, whereby a first position of the damage being detected on a one-dimensional coordinate in an extending direction of the first electrode unit.

The method further comprises: short-circuiting all of electrodes in the second electrode unit; selecting a plurality of electrode sets one set after another set in the first electrode unit, each set comprising three electrodes adjacent to each other in the first electrode unit; supplying an AC voltage from an AC power source across a central one of each electrode set in the first electrode unit and the short-circuited electrodes in the second electrode unit; measuring a potential difference between the other electrodes in the each electrode set to produce a measured voltage signal; phase-detecting the measured voltage signal with a signal synchronized with the AC voltage from the AC power source to produce a detected signal, a series of the detected signals produced one after another changing in polarity due to a damage existing in the sheet, whereby a second position of the damage can be detected on a one-dimensional coordinate in an extending direction of the second electrode unit; and defining a two-dimensional position of the damage from the first and the second positions.

According to another aspect of the present invention, a method for detecting a leakage position in an impervious sheet comprises: disposing two first and second electrode units on an upper side and a lower side of the impervious sheet, the first and the second electrode units extending in two directions perpendicular to each other, respectively; connecting all of electrodes in the first electrode unit to one of terminals of an AC power source; applying the AC voltage from the AC power source across two electrodes at both outer sides of the second electrode unit; measuring potentials of electrodes disposed between the two electrodes in the second electrode unit one after another; and phase-detecting the measured potentials by a signal synchronized with the AC voltage of the AC power source to obtain a phase detected output, when the phase-detected output voltage is varied from the potential inclination at one electrode in the vicinity of the damage, a first position of the damage being determined on a first one-dimensional coordinate in the extending direction of the first electrode unit.

The method further comprises: connecting all of electrodes in the second electrode unit to one of terminals of the AC power source; applying the AC voltage from the AC power source across two electrodes at both outer sides of the first electrode unit; measuring potentials of electrodes disposed between the two outer side electrodes in the first electrode unit one after another; phase-detecting the measured potentials by a signal synchronized with the AC voltage of the AC power source, when the phase detected output voltage is varied from the potential inclination at one electrode, a second position of the damage being determined on a second one-dimensional coordinate in the extending direction of the second electrode unit; and defining a two-dimensional position of the damage from the first and the second positions.

According to another aspect of the present invention, a method for detecting a leakage position in an impervious sheet comprises: disposing two first and second electrode unite on an upper side and a lower side of the impervious sheet, the first and the second electrode units extending in two directions perpendicular to each other, respectively; connecting a selected one of the electrodes in the first electrode units to one of the opposite outer side electrodes in the second electrode unit; measuring potentials of the electrodes between the opposite outer side electrodes in the second electrode unit; selecting one of electrodes in the first electrode unit one after another and repeating the connecting and measuring operations for each one electrode selected; phase-detecting the measured potential to produce a phase-detected output, the damage position being determined as a position near an intersecting point of the selected electrode and the measuring electrode when the phase-detected output voltage is varied from the potential inclination at one measuring electrode in the second electrode unit.

According to the present invention, an apparatus for detecting a leakage position in a waste disposal site can be obtained which comprises: a first electrode unit consisting of a plurality of first electrodes made from conductive elongated materials and arranged on one surface of the impervious sheet; a second electrode unit consisting of a plurality of second electrodes made from the conductive elongated material and arranged on the other surface of the impervious sheet in a direction intersecting to the first electrode elements; an AC power source for supplying an AC voltage; first electrode selective-switching means for selecting predetermined electrode from the first electrodes; second electrode selective-switching means for selecting predetermined electrode from the second electrodes; measuring means for measuring potentials of electrodes selected by the first and the second electrode selective-switching means to produce a measured potential; phase-detecting means for detecting the measured potential by a signal synchronized with the AC voltage to produce a detected output signal; and processing means for processing the detected output signal to define the leakage position from the detected output signal.

In an aspect of the present invention, the apparatus comprises: the first electrode selective-switching means selecting and connecting all of the first electrodes to one of output terminals of the AC power source; the second electrode selective-switching means selecting, as a selected electrode, each one of the second electrodes one by one and connecting the selected electrode to the measuring means; and the processing means defining as a position on one-dimensional coordinate a position of the selected electrode when the detected output signal is changed.

In another aspect, the apparatus comprises: the first electrode selective-switching means selecting and connecting all of the first electrodes to one of output terminals of the AC power source; the second electrode selective-switching means selecting and connecting two opposite outside electrodes in the second electrode unit to the terminals of the AC power source, respectively, and selecting, as a selected electrode, each one of the second electrodes between the opposite outside electrodes one by one and connecting the selected electrode to the measuring means; and the processing means defining as a position on one-dimensional coordinate a position of the selected electrode when the detected output signal is changed.

In another aspect, the apparatus may comprise: the first electrode selective-switching means selecting the first electrodes one by one, as a selected electrode, and connecting the selected electrode to one of output terminals of the AC power source; the second electrode selective-switching means selecting and connecting two opposite outside electrodes in the second electrode unit to the terminals of the AC power source, respectively, and selecting, as a measuring electrode, each one of the second electrodes between the opposite outside electrodes one by one and connecting the measuring electrode to the measuring means; and the processing means defining, as a position on two-dimensional coordinate, an intersecting position of the selected electrode and the measuring electrode when the detected output signal is changed.

DESCRIPTION OF PREFERRED EMBODIMENTS

Figure 1:
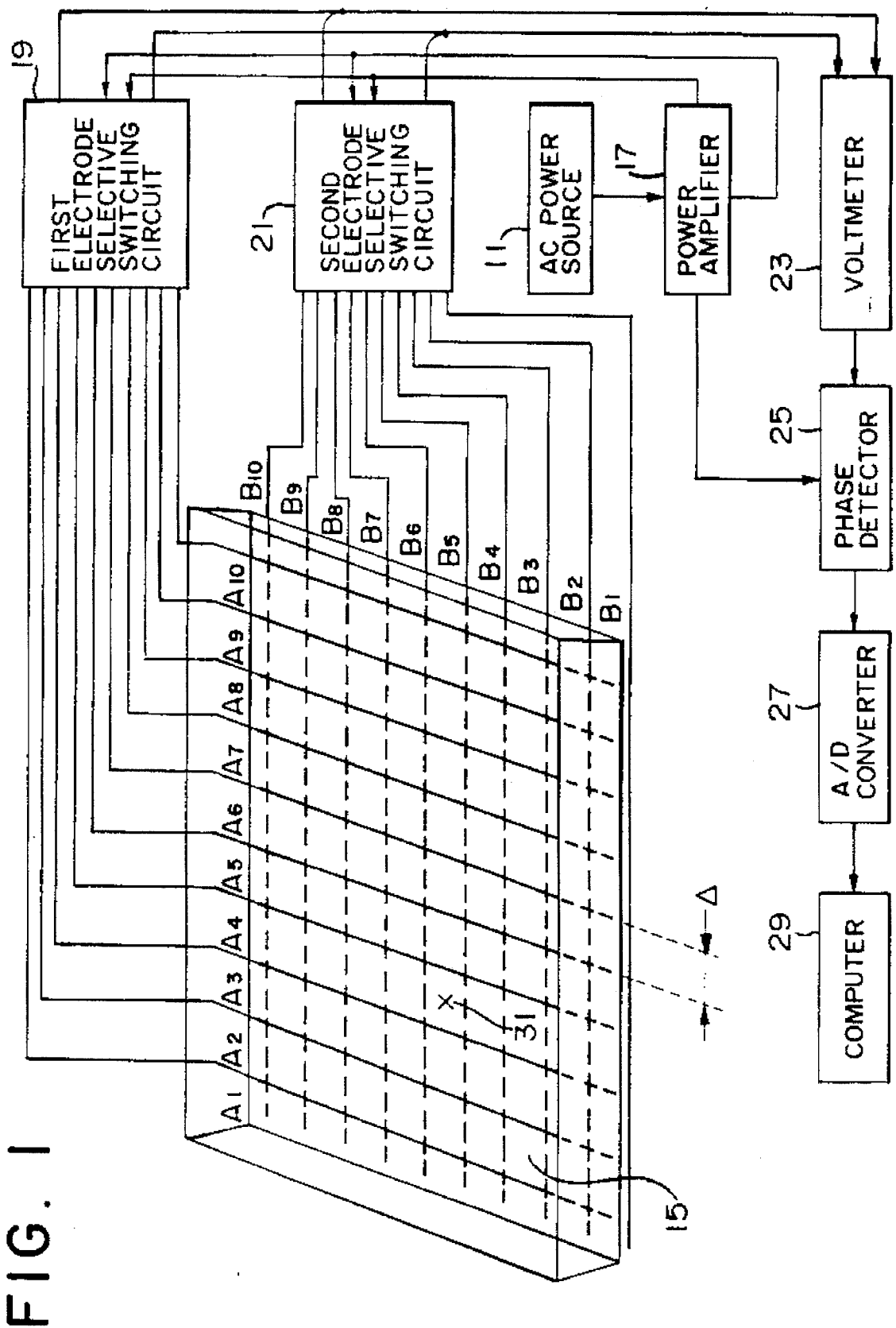
FIG. 1 shows a diagrammatic view of an apparatus for detecting a leakage position according to a first embodiment of the present invention.
Figure 2:
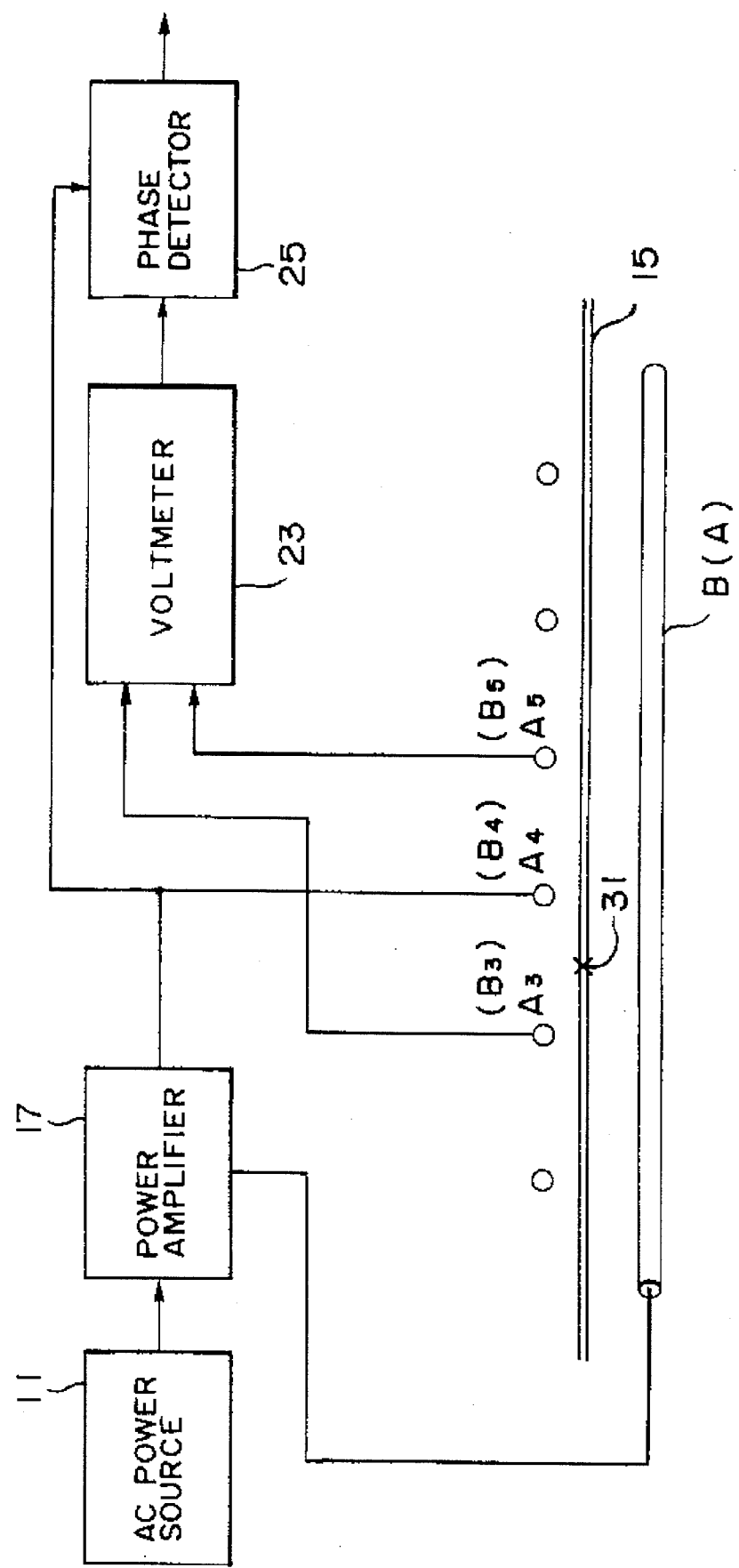
FIG. 2 shows a block diagram of a connection mode of measuring electrodes and measuring circuits in a main portion of the apparatus in FIG. 1.

Referring to FIGS. 1 and 2, the apparatus according to the first embodiment shown therein comprises an impervious sheet 15, first electrodes A1 to A10, which will be collectively called a first electrode unit A and are arranged and disposed in parallel with a first direction on an upper side surface of the impervious sheet 15, and second electrode elements B1 to B10, which will be collectively called a second electrode unit B and are arranged and disposed in parallel with a second direction perpendicular to the first direction on a lower side surface of the impervious sheet 15.

The apparatus has an AC power source 11, an output of which is, in turn, applied to a power amplifier 17. An output from the power amplifier 17 is applied across the first electrode unit A and the second electrode unit B through a first and a second selective switching circuit 19 and 21, respectively.

In detail, the output of the amplifier 17 is applied across an electrode as a selected electrode in one electrode unit selected from the first electrode unit A and the second electrode unit B and all electrodes of the other electrode unit, as shown in FIG. 2. A voltmeter or potentiometer 23 is connected to two electrodes disposed both sides of the selected electrode through the corresponding one of the first and the second selective switching circuits 19 and 21 in order to measure a potential difference between the two electrodes. In an example shown in FIG. 2, electrode A4 is the selected electrode and, therefore, electrodes A3 and A5 adjacent to and at both sides of the selected electrode A4 are connected, as measured electrodes, to the voltmeter 23 through the first selective switching circuit 19. The voltage signal measured across electrodes A3 and A5 is applied to a phase-detector 25. All of the second electrodes are connected to a ground terminal of the output of the power amplifier 17 through the second electrode selective switching circuit 21.

In the phase-detector 25, the measured voltage signal from the voltmeter 23 is phase-detected by a signal synchronized with the AC power source 11, or by use of the signal from the power amplifier 17 to produce a detected output signal. An A/D converter 27 receives the detected output signal and converts it into a digital data signal, which is supplied to a computer 29.

The selected electrode and measuring electrodes are shifted one after another in the first electrode unit A, and the detected output signal is produced one by one to obtain a series of detected output signals.

Thereafter, the measurement is carried out for the second electrode unit B. That is, as shown at reference symbols enclosed in parentheses in FIG. 2, the first electrode unit A is commonly connected to the ground terminal of the output of the power amplifier 17 and one electrode in the second electrode unit B is connected, as a selected electrode, to the other output terminal of the power amplifier 17. Both electrodes adjacent the selected electrode in the second electrode unit B are also connected to the potentiometer 23. When the selected electrode is shifted one by one in the second electrode unit B, another series of the similar detected output signals can be obtained at the output of the phase-detector 25 and can be converted into a digital data signal at the A/D converter 27. The detected signal obtained for the first electrode unit A and that for the second electrode unit B are called a first detected output signal and a second detected output signal, hereinafter.

The computer 29 comprises a first deciding portion, a second deciding portion, and a defining portion. The first deciding portion decides a first position on a first one-dimensional coordinate of the leakage position on the basis of a series of the first detected output signals. The second deciding portion decides a second position on another one-dimensional coordinate of the leakage position on the basis of the second series of detected output signals. The defining portion defines two dimensional position from the first and the second positions on the first and the second one-dimensional coordinates.

The series of the detected output signals are not almost changed but are constant in the level if the damage is not made in the impervious sheet 15. However, if a damage occurs in the sheet 15, the series of the detected output signals vary in the level because the increased current flows through the sheet portion in the vicinity of the damaged portion. In the example in FIG. 2, when there is a damage at a position on any one side of the selected electrode A4, the increased voltage is output from the voltmeter 23. Therefore, the detected output signal is changed between positive polarity and negative polarity by shift of the selected electrode. Accordingly, the changing point in the series of the first detected output signals obtained for the first electrode unit A represents the first position on the first one-dimensional coordinate of the damaged position of the impervious sheet 15. The first one-dimensional coordinate is the direction in which the selection of the electrode is shifted and is, therefore, the second direction.

For the second electrode unit B, the series of the second detected output signals also vary due to the damage in the sheet 15 and the polarity changing point in the series represents the second position on the second one-dimensional coordinate of the damage.

Figure 3:
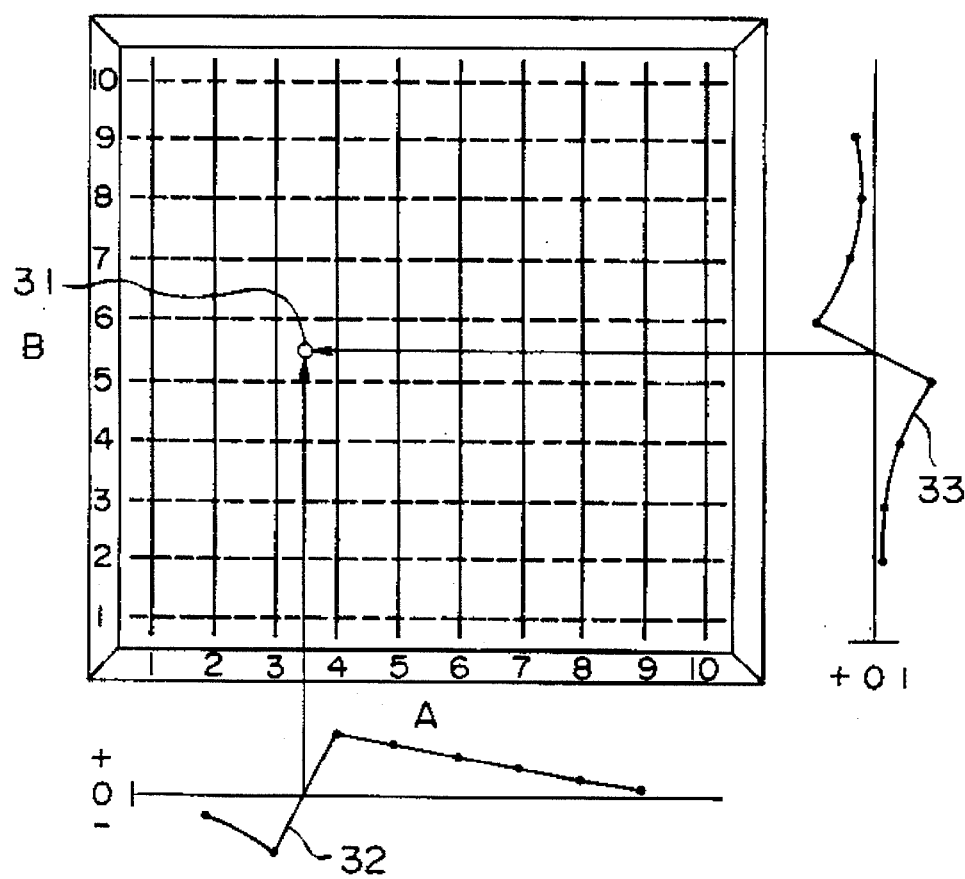
FIG. 3 shows a diagram illustrating an electrode arrangement array and a leakage position on the array, together with results drawn by a computer which are measured by the apparatus in FIG. 1.

Referring to FIG. 3, when the sheet 15 has a damage 31 at a position between two first electrodes A3 and A4 and between two second electrodes B5 and B6, the series of the first detected output signals has the changing point from negative to positive at a position between the two first electrodes A3 and A4, as shown by a curve 32 which is drawn by the computer 29. Similarly, the series of the second detected output signals has the changing point from negative to positive at a position between the two second electrodes B5 and B6, as shown by a curve 33 which is drawn by the computer 29.

Accordingly, the damage 31 is defined by the first and the second positions on the first and the second one-dimensional coordinates.

Figure 4:
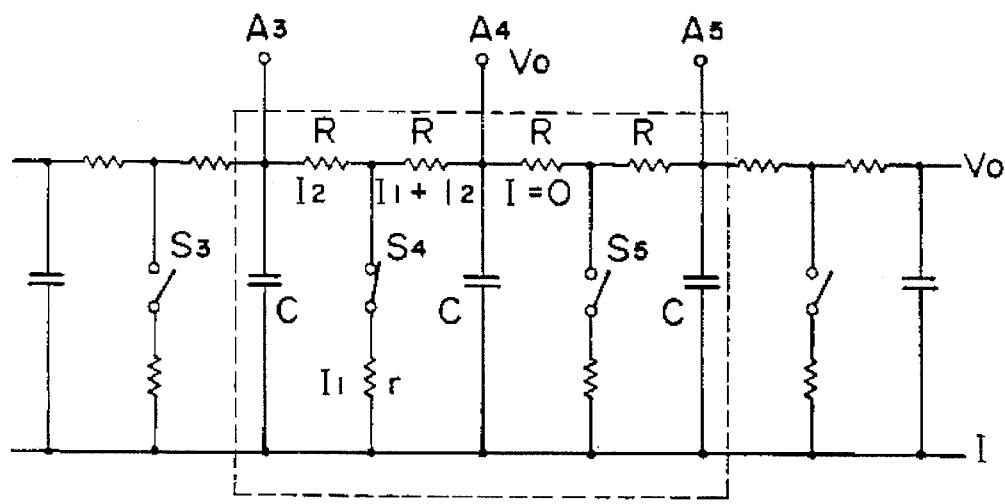
FIG. 4 shows an equivalent circuit diagram illustrating a portion in the vicinity of electrodes used for measurement in the apparatus of FIG. 1.

FIG. 4 shows an equivalent circuit of a circumferential region of the selected electrode A4 and measuring electrodes A3 and A5 in the measurement for the first electrode unit A.

Referring to FIG. 4, a symbol R represents a resistance between adjacent electrodes, C is a capacitance of the sheet 15, r is a resistance of the soil in the damage of the sheet 15, $V_0$ is the applied voltage across the electrode A4 and the second electrode B, I is a current flowing the circuit. S is a switch equivalent to the damage. When the damage exists in the sheet 15, the switch is closed to introduce resistor r into the circuit. In the example shown in the figure, the damage exists between the electrodes A3 and A4. Accordingly, the switch S4 therebetween is closed. In the circuit, the following equations (1) and (2) are given:

$$(I_1+I_2)R+I_1r=V_0 \quad (1)$$

$$(I_1+I_2)R+I_2r(R+1/jwC)=V_0 \quad (2)$$

From these two equations (1) and (2), $I_2$ is calculated as:

$$I_2=V_0/\{2R(R/r+1)-R^2/r+(1+R/r)/jwC\} \quad (3)$$

Voltage $V_3$ of the electrode $A_3$ is given by multiplying $I_2$ of equation (3) by (jwC). Then, $V_5$ of the electrode $A_5$ accompanied with no damage is obtained from the equation of $V_3$ by replacing 0 for 1/r in the equation. That is:

$$V_3=V_0/\{(1+R/r)+JwCR(2+R/r)\} \quad (4)$$

$$V_5=V_0/(1+Jw2CR) \quad (5)$$

Providing that R/r is quite smaller than 1 and that the frequency w of the applied voltage $V_0$ is set low so that the phase variation of the current I is limited low, a difference voltage $V_5-V_3$ is given by:

$$V_5-V_3=V_0R/r \quad (6)$$

That is, the difference voltage is in almost inverse proportion to r.

The difference voltage is phase-detected with a voltage signal synchronized with the applied voltage $V_0$, and the output of phase detecting circuit 25 equals to $V_0$ R/r in equation (6).

According to the above-described embodiment of the present invention, a damaged position of the impervious sheet can be detected accurately for a short time by disposing the first and the second electrode units on the upper side and the lower side of the impervious sheet, respectively, with the first electrode unit intersecting with the second electrode unit, short-circuiting all of electrodes in the first electrode unit, selecting a plurality of electrode sets one set after another set, each set comprising three electrodes adjacent to each other in the second electrode unit, supplying an AC voltage from an AC power source across a central one of each electrode set and the short-circuited electrodes, measuring a potential difference between the other electrodes in each electrode set to produce a measured voltage signal phase-detecting the measured voltage signal with a signal is a phase detected synchronized with the AC voltage from the AC power source to produce a detected signal, a series of the detected signals produced one after another changing in polarity due to a damage existing in the sheet. Thus, a first position of the damage can be detected on a one-dimensional coordinate in an extending direction of the first electrode unit. Thereafter, the similar operation is repeated by replacing the first electrode by the second electrode, that is, by short-circuiting all of electrodes in the second electrode unit, selecting a plurality of electrode sets one set after another set, each set comprising three electrodes adjacent to each other in the first electrode unit, supplying an AC voltage from an AC power source across a central one of each electrode set and the short-circuited electrodes, measuring a potential difference between the other electrodes in each electrode set to produce a measured voltage signal, phase-detecting the measured voltage signal is phase detected with a signal synchronized with the AC voltage from the AC power source to produce a detected signal, a series of the detected signals produced one after another changing in polarity due to a damage existing in the sheet. Thus, a second position of the damage can be detected on a one-dimensional coordinate in an extending direction of the second electrode unit. Accordingly, the damaged position in the sheet 15 can be detected from the first and second positions for a short time.

In addition, since the measuring electrodes are disposed near the impervious sheet 15, detecting accuracy is affected neither by an electric properties of wasted materials nor by depth of wasted materials laid under the ground.

Figure 5:
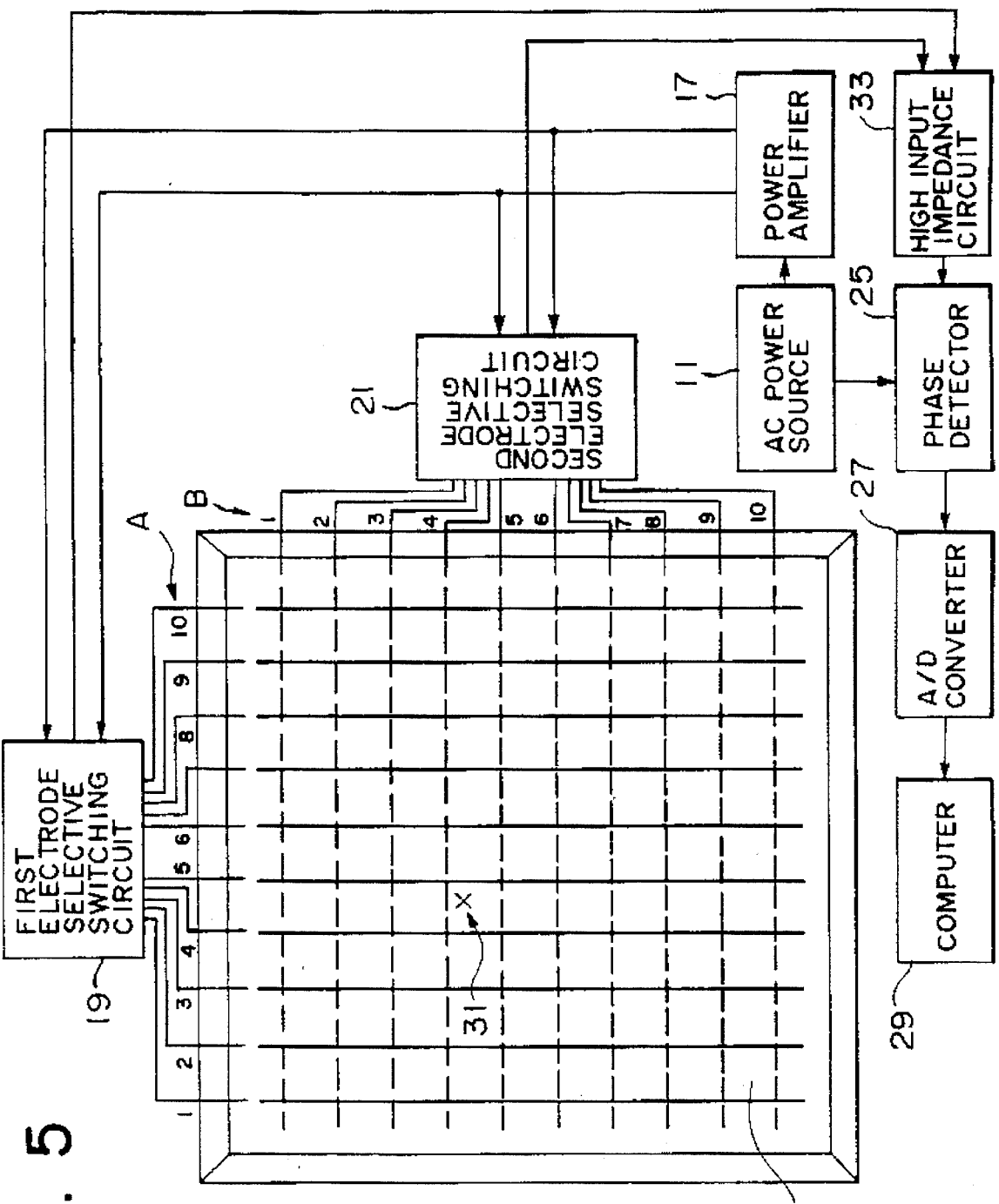
FIG. 5 shows a diagrammatic view of another apparatus according to a second embodiment of this invention.
Figure 6:
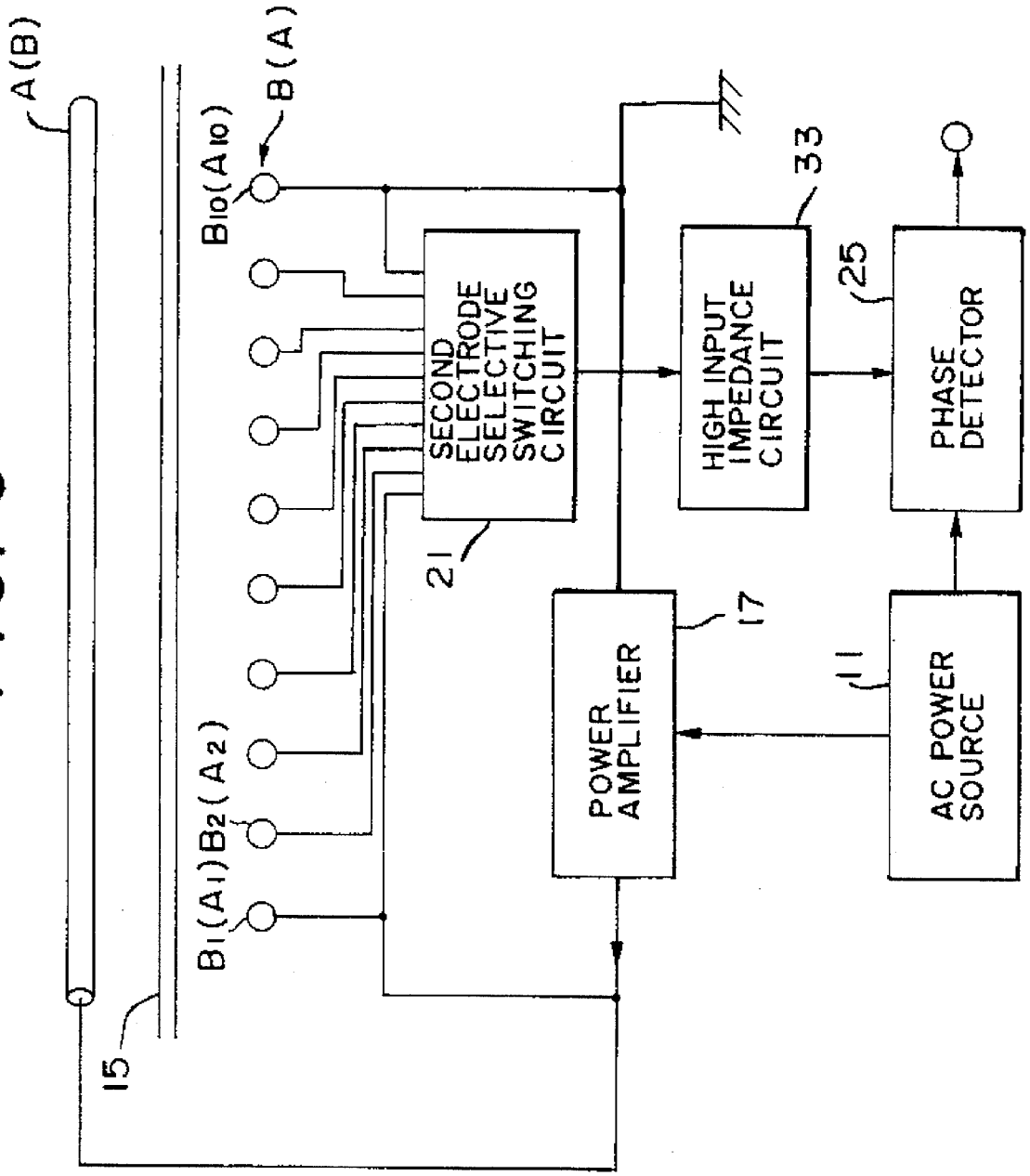
FIG. 6 shows a block diagram of a connection mode of measuring electrodes and measuring circuits in a main portion of the apparatus in FIG. 5.

The description will be succeeded as regards a leakage position detecting apparatus according to a second embodiment of the present invention with reference to FIGS. 5 to 7.

Referring to FIG. 5, the leakage position detecting apparatus shown therein also comprises the impervious sheet 15 which is associated with a first electrode unit A and a second electrode unit B in the similar fashion as in the first embodiment in FIG. 1. The apparatus further comprises the AC power source 11, the power amplifier 17, the first electrode selective switching circuit 19, the second electrode selective switching circuit 21, the phase-detecting circuit 25, the A/D converter 27, and the computer 29 similar to the apparatus shown in FIG. 1. However, the apparatus in FIG. 5 has a high input impedance circuit 33 in place of the potentiometer 23 in FIG. 1. That is, the high input impedance circuit 33 is connected to the first and the second electrode selective switching circuits 19 and 21 so as to be selectively connected to electrodes $A_1-A_{10}$ and $B_1-B_{10}$. The high input impedance circuit 33 is also connected to the phase detecting circuit 25.

Referring to FIG. 6, description will be made as to leakage position detecting operation by use of the apparatus.

The output of the AC power source 11 is amplified by the power amplifier 17. The amplified output is applied across electrodes $B_1$ and $B_{10}$ disposed opposite outer sides of the second electrode unit B. One of output terminals of the power amplifier 17 is a ground terminal. The ground terminal is shown to be connected to the electrode $B_{10}$. The other output terminal of the power amplifier 17 is connected to the electrode $B_1$ and is connected to all of the first electrodes $A_1-A_{10}$ through the first electrode selective switching circuit 19. In the connection, the potential of the second electrode $B_1$ in reference to electrode $B_{10}$ is maintained at the potential of the AC voltage supplied from the power amplifier 17. The potential of each of the electrodes $B_2-B_9$ gradually lowers in this order. That is, there is a potential inclination over the region from $B_2$ to $B_9$. However, when there is a damaged portion in the impervious sheet 15, an increased electric current flows in the damaged portion. On the other hand, the first electrodes $A_1-A_{10}$ are supplied with the electric potential equal to the second electrode $B_1$. Therefore, the electric potential of a certain second electrode which is in the vicinity of the damaged portion is higher than an electric potential in the potential inclination.

The potentials of the electrodes $B_2-B_9$ are detected by the high input impedance circuit 33 one by one by shifting the electrode connected thereto by the second electrode selective switching circuit 21. The output of the high input impedance circuit 33 is phase-detected at the phase-detecting circuit 25 by a signal synchronized with the AC voltage from the AC power source 11. The phase-detected output is applied to the computer 29 through the A/D converter 27.

Figure 7A:
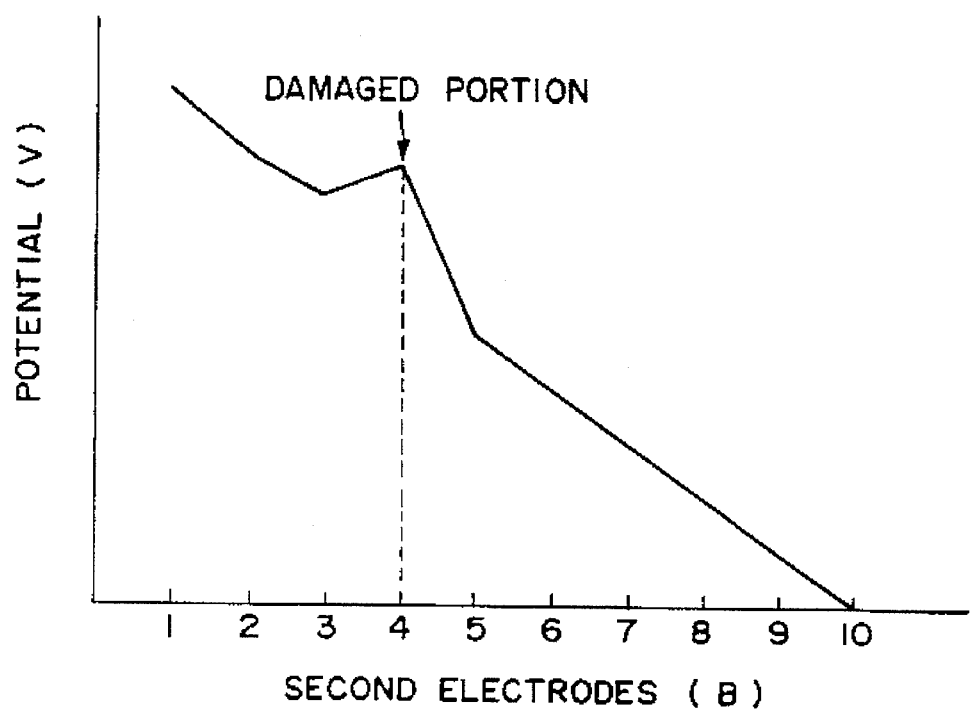
FIGS. 7A and 7B show views illustrating different data measured in use of the connection mode of FIG. 6 by the apparatus of FIG. 5.

The computer 29 processes the phase detected output applied thereto one after another to make a graph indicating a relation between the potential and the position of each of electrodes $B_1-B_{10}$. Providing that a damaged position exists in the vicinity of the electrode B4, the graph is as shown in FIG. 7A. That is, the second deciding portion of the computer 29 decides a second one-dimensional position of the leakage position or the damaged portion from the phase-detected output signals during the measurement of potentials of the second electrodes B.

Next, the connection of the first electrode unit A and the second electrode unit B with the other circuit portions in the apparatus is made as indicated by reference symbols enclosed in parentheses in FIG. 6, and the potentials of the first electrodes $A_2-A_9$ are measured one after another in the similar manner as in measurement for second electrodes $B_2-B_9$ as described above. Providing that the damaged portion is in the vicinity of the first electrode A5, the relationship between the potentials and positions of the electrodes A2–A9 is shown in FIG. 7R. That is, the first deciding portion of the computer 29 decides a first one-dimensional position of the leakage position or the damaged portion from the phase-detected output signals during the measurement of potentials of the first electrodes A.

The position on the two-dimensional coordinate of the damaged position is determined by the first and the second dimensional positions.

Figure 7B:
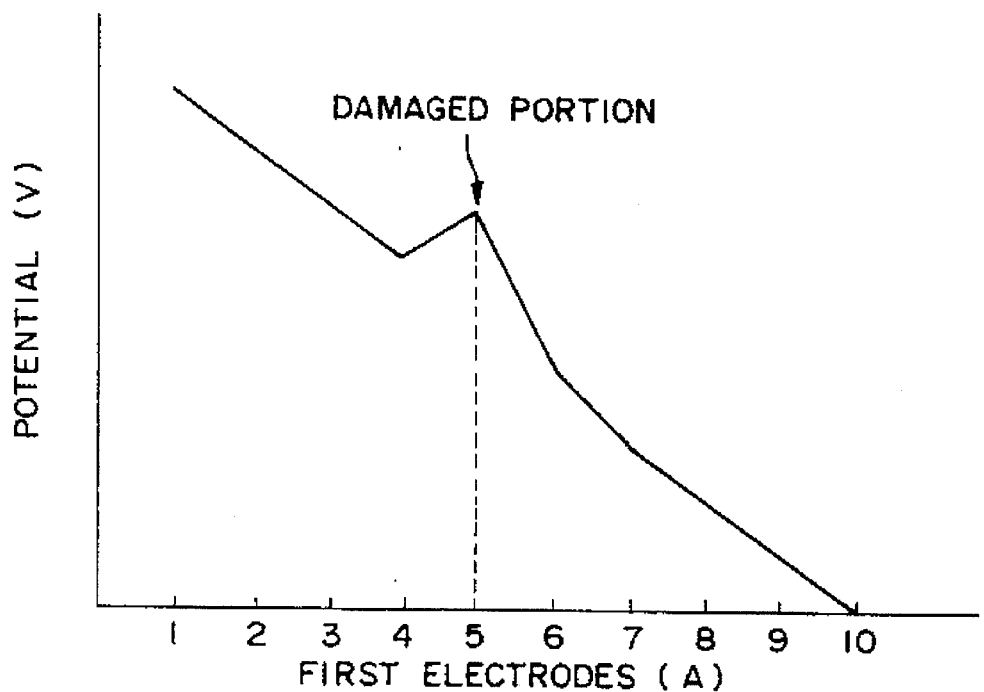
Figure 8:
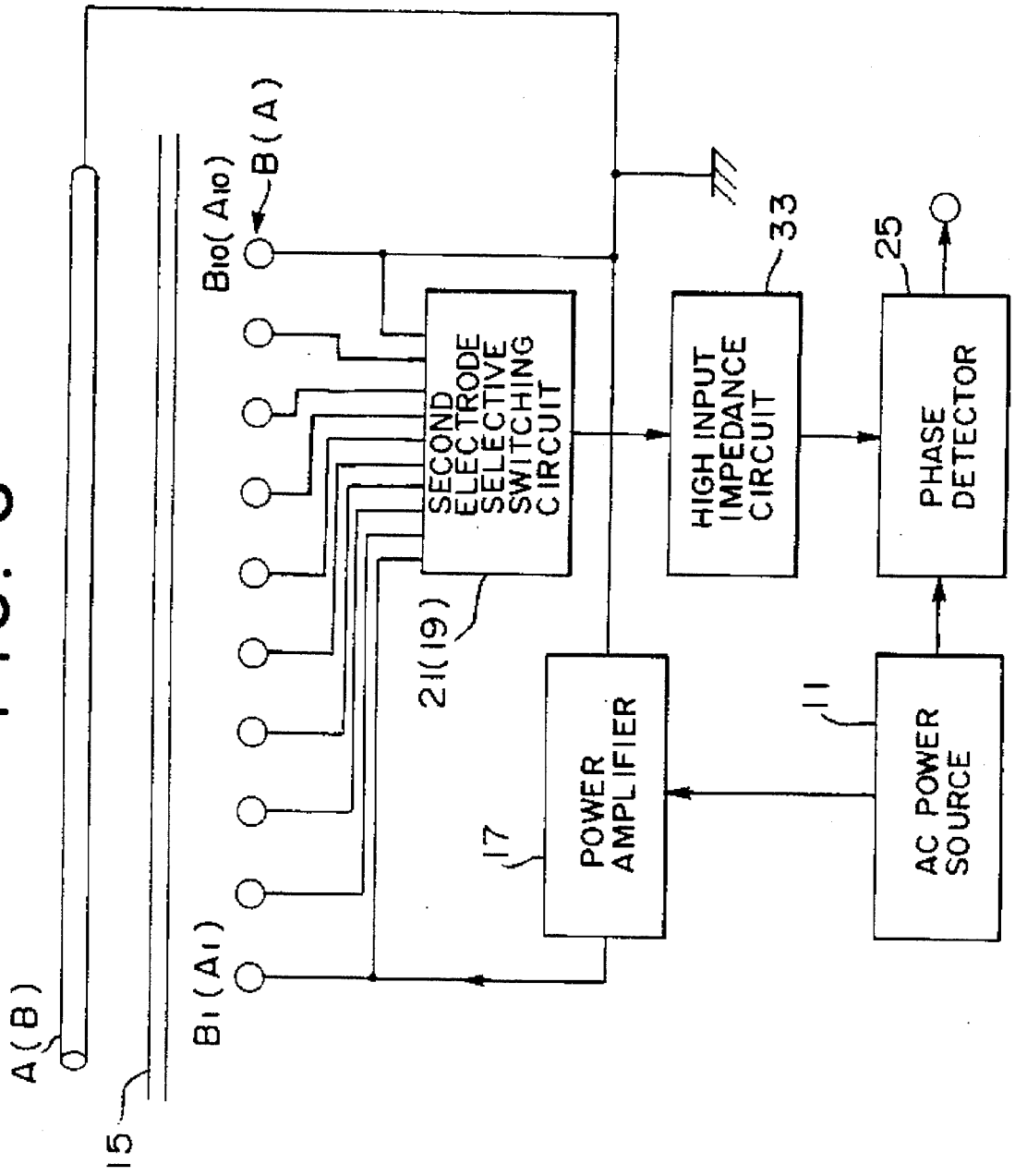
FIG. 8 shows a block diagram of another connection mode of measuring electrodes and measuring circuits in a main portion of the apparatus in FIG. 5.
Figure 9A:
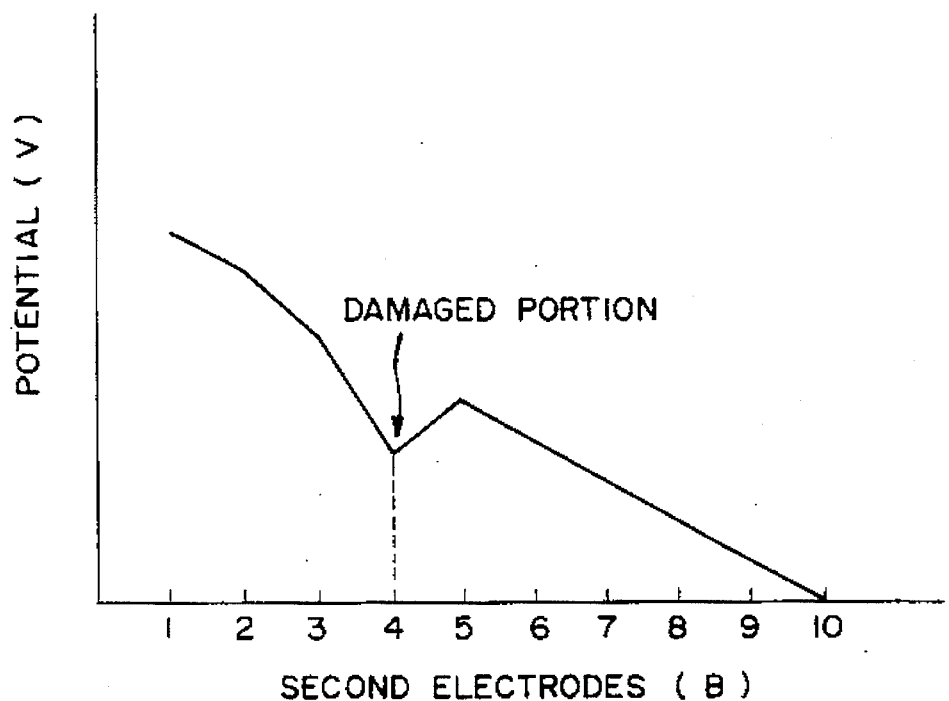
FIGS. 9A and 9B show views illustrating different data measured in use of the connection mode of FIG. 8 by the apparatus of FIG. 5.
Figure 9B:
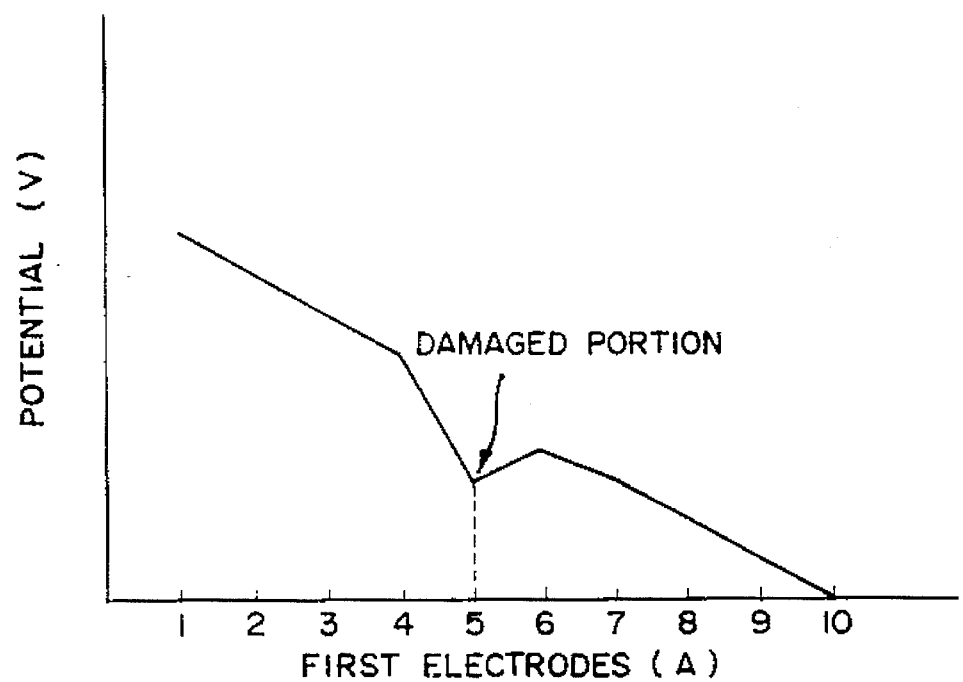

Referring to FIG. 8, another connection in the apparatus of FIG. 5 is shown in the figure. The output of the power amplifier 13 is applied to the two electrodes $B_1$ and $B_{10}$ ($A_1$ and $A_{10}$) in the similar manner as in FIG. 6. However, all of the electrodes $A_1-A_{10}$ ($B_1-B_{10}$) are connected to the ground terminal of the output terminals of the power amplifier 17 and not to the other terminal. Accordingly, if there is a damaged portion in the impervious sheet 15, the measured potential of one electrode of electrodes $B_2-B_9$ ($A_2-A_9$) in the vicinity of the damaged portion is lowered from the potential on the potential inclination, as shown in FIGS. 9A and 9B. This is different from FIGS. 7A and 7B.

In the second embodiment as described above, two first and second electrode units are disposed on the upper side and the lower side of an impervious sheet and extend in two directions perpendicular to each other, respectively. All of electrodes in the first electrode unit are connected to one of terminals of an AC power source. The AC voltage from the AC power source is applied across two electrodes at both outer sides of the second electrode unit. Potentials of electrodes disposed between the two electrodes in the second electrode unit are measured one after another, and are phase-detected by a signal synchronized with the AC voltage of the AC power source. If there is a damage in the impervious sheet, the phase-detected output voltage is varied from the potential inclination at one electrode in the vicinity of the damage. Thus, a first position of the damage is obtained which is on a first one-dimensional coordinate in the extending direction of the first electrode unit. Thereafter, all of electrodes in the second electrode unit are connected to one of terminals of an AC power source. The AC voltage from the AC power source is applied across two electrodes at both outer sides of the first electrode unit. Potentials of electrodes disposed between the two electrodes in the first electrode unit are measured one after another, and are phase-detected by a signal synchronized with the AC voltage of the AC power source. The phase-detected output voltage is varied from the potential inclination at one electrode in the vicinity of the damage. Thus, a second position of the damage is obtained which is on a second one-dimensional coordinate in the extending direction of the second electrode unit. Thus, the position of the damage can be detected from the first and the second positions for a short time.

In the methods as described in connection with FIGS. 6 and 8, all of the electrodes in one of the first and the second electrodes units are connected to one of the opposite outer side electrodes in the other electrode unit, and potential measurement is performed on the electrodes between the opposite outer side electrodes in the other electrode unit.

However, there is another possible method for detecting the position of the damage in the sheet. That is, a selected one (for example, $A_1$ in FIG. 5) of the electrodes in the first electrode units A is connected to one ($B_1$ or $B_{10}$) of the opposite outer side electrodes in the second electrode unit, and potential measurement is performed of the electrodes (B2–B9) between the opposite outer side electrodes in the second electrode unit. Then, the next one electrode (A2) in the first electrode unit, is selected and connected to the electrode of the opposite outer side electrodes in the second electrode unit, and the potential measurement is performed of the electrodes (B2–B9) between the opposite outer side electrodes in the second electrode unit. The operation is repeated with selection of the electrodes in the first electrode unit one after another. If there is damage in the impervious sheet, the phase-detected output voltage is varied from the potential inclination at one electrode in the vicinity of the damage. Therefore, when the phase detected output voltage is varied from the potential inclination at one measuring electrode in the second electrode unit, the damage position is determined as a position near an intersecting point of the selected electrode (one of $A_1-A_{10}$) and the measuring electrode (one of $B_2-B_9$).

It is needless to say that the first and the second electrode units A and B can be replaced by one another. The similar result can be obtained.

What is claimed is:

1. A method for detecting a leakage position in an impervious sheet, which comprises the steps of:

disposing first and second electrode units on an upper side and a lower side of the impervious sheet, respectively, said first electrode unit intersecting with said second electrode unit, said first electrode unit comprising a plurality of first electrodes, said second electrode unit comprising a plurality of second electrodes;

short-circuiting all of the first electrodes in said first electrode unit;

selecting a plurality of second electrode sets one set after another set in said second electrode unit, each set comprising three second electrodes adjacent to each other;

supplying an AC voltage from an AC power source across a central one of each second electrode set and said short-circuited first electrodes of said first electrode unit;

measuring a potential difference between the other two electrodes in said each second electrode set to produce a first measured voltage signal; and phase-detecting said first measured voltage signal with a signal synchronized with the AC voltage from said AC power source to produce a first detected signal, a series of the first detected signals produced one after another changing in polarity due to a damage existing in the sheet, whereby a first position of the damage being detected on a first one-dimensional coordinate in an extending direction on said first electrode unit.

2. A method as claimed in claim 1, which further comprises the steps of:

short-circuiting all of the second electrodes in said second electrode unit;

selecting a plurality of first electrode sets one set after another set in the first electrode unit, each set comprising three first electrodes adjacent to each other in the first electrode unit;

supplying the AC voltage from said AC power source across a central one of each first electrode set in said first electrode unit and the short-circuited second electrodes in said second electrode unit;

measuring a potential difference between the other two electrodes in the each first electrode set to produce a second measured voltage signal;

phase-detecting the second measured voltage signal with a signal synchronized with the AC voltage from said AC power source to produce a second detected signal, a series of the second detected signals produced one after another changing in polarity due to the damage existing in the sheet, whereby a second position of the damage can be detected on a second one-dimensional coordinate in an extending direction of the second electrode unit; and defining a two-dimensional position of the damage from said first and said second positions.

3. A method for detecting a leakage position in an impervious sheet, which comprises the steps of:

disposing two first and second electrode units on an upper side and lower side of the impervious sheet, said first and said second electrode units extending in two directions perpendicular to each other, respectively, said first electrode unit comprising a plurality of first electrodes, said second electrode unit comprising a plurality of second electrodes;

connecting all of the first electrode in the first electrode unit to a terminal of the AC power source;

applying an AC voltage from said AC power source across two opposite outside second electrodes at both outer sides of said second electrode unit;

successively selecting, as selected second electrodes, each one of said second electrodes between the two opposite outside second electrodes one by one;

measuring first potentials of the selected second electrodes disposed between said two opposite outside second electrodes in said second electrode unit one after another; and phase-detecting said measured first potentials by a signal synchronized with the AC voltage of said AC power source to obtain a first phase-detected output voltage, when said first phase-detected output voltage is varied from the potential inclination at one electrode in the vicinity of a damage, a first position of the damage being determined on a first one-dimensional coordinate in the extending direction of said first electrode unit.

4. A method as claimed in claim 3, which further comprises the steps of:

connecting all of the second electrodes in said second electrode unit to the terminal of said AC power source;

applying the AC voltage from said AC power source across two opposite outside first electrodes at both outer sides of said first electrode unit;

successively selecting, as selected first electrodes, each one of said first electrodes between the two opposite outside first electrodes one by one;

measuring second potential of the selected first electrodes disposed between the two opposite outside first electrodes in the first electrode unit one after another;

phase-detecting the measured second potentials by a signal synchronized with the AC voltage of said AC power source to obtain a second phase-detected output voltage, when the second phase-detected output voltage is varied from the potential inclination at one electrode in the vicinity of the damage, a second position of the damage being determined on a second one-dimensional coordinate in the extending direction of said second electrode unit; and defining a two-dimensional position of the damage from the first and the second positions.

5. A method for detecting a leakage position in an impervious sheet, which comprises:

disposing two first and second electrode units on an upper side and a lower side of the impervious sheet, said first and said second electrode units extending in two directions perpendicular to each other, respectively;

connecting a selected one of the electrodes in said first electrode units to one of the opposite outer side electrodes in said second electrode unit;

measuring potentials of the electrodes between said opposite outer side electrodes in the second electrode unit;

selecting one of electrodes in said first electrode unit one after another and repeating said connecting and measuring operations for each one electrode selected;

phase detecting said measured potential to produce a phase-detected output, the damage position being determined as a position near an intersecting point of the selected electrode and the measuring electrode when the phase-detected output voltage is varied from the potential inclination at one measuring electrode in the second electrode unit.

6. An apparatus for detecting a leakage position in a waste disposal site, which comprises:

a first electrode unit consisting of a plurality of first electrodes made from conductive elongated materials and arranged on one surface of said impervious sheet;

a second electrode unit consisting of a plurality of second electrodes made from the conductive elongated material and arranged on the other surface of said impervious sheet in a direction intersecting to said first electrode elements;

an AC power source for supplying an AC voltage;

first electrode selective-switching means for selecting a predetermined electrode from said first electrodes;

second electrode selective-switching means for selecting a predetermined electrode from said second electrodes;

measuring means for measuring potentials of electrodes selected by said first and said second electrode selective-switching means to produce a measured potential;

phase-detecting means for detecting said measured potential by a signal synchronized with said AC voltage to produce a detected output signal; and processing means for processing said detected output signal to define said leakage position from said detected output signal.

7. An apparatus for detecting a leakage position of an impervious sheet in a waste disposal site, which comprises:

a first electrode unit consisting essentially of a plurality of first electrodes made from conductive elongated materials and arranged on one surface of said impervious sheet;

a second electrode unit consisting essentially of a plurality of second electrodes made from the conductive elongated materials and arranged on the other surface of said impervious sheet in a direction intersecting to said first electrodes;

an AC power source, having output terminals, for supplying an AC voltage;

first electrode selective-switching means for selecting and connecting all of said first electrodes to one of the output terminals of said AC power source;

second electrode selective switching means for selecting, as three selected electrodes, three second electrodes adjacent to each other to make said AC power course supply the AC voltage across a central one of the three selected electrodes and said first electrodes of said first electrode unit;

measuring means for measuring a potential difference between the other two electrodes of said three selected electrodes to produce a measured voltage signal;

phase-detecting means for detecting said measured voltage signal by a signal synchronized with said AC voltage to produce a detected output signal; and processing means for processing said detected output signal to define, as a position on a one-dimensional coordinate, a position of the central one of the three selected electrodes when said detected output signal is changed.

8. An apparatus for detecting a leakage position of an impervious sheet in a waste disposal site, which comprises:

a first electrode unit consisting essentially of a plurality of first electrodes made from conductive elongated materials and arranged on one surface of said impervious sheet;

a second electrode unit consisting essentially of a plurality of second electrodes made from the conductive elongated materials and arranged on the other surface of said impervious sheet in a direction intersecting to said first electrodes;

an AC power source, having output terminals, for supplying an AC voltage;

first electrode selective-switching means for selecting and connecting all of said first electrodes to one of the output terminals of said AC power source;

second electrode selective-switching means for selecting and connecting two opposite outside electrodes in said second electrode unit to the output terminals of said AC power source, respectively, and for selecting, as a selected electrode, each one of said second electrodes between said opposite outside electrodes one by one and connecting said selected electrode to said measuring means;

measuring means for measuring a potential of said selected electrode to produce a measured potential;

phase detecting means for detecting said measured potential by a signal synchronized with said AC voltage to produce a detected output signal; and processing means for processing said detected output signal to define as a position on a one-dimensional coordinate, a position of the selected electrode when said detected output signal is changed.

9. An apparatus for detecting a leakage position of an impervious sheet in a waste disposal site, which comprises:

a first electrode unit consisting essentially of a plurality of first electrodes made from conductive elongated materials and arranged on one surface of said impervious sheet;

a second electrode unit consisting essentially of a plurality of second electrodes made from conductive elongated materials and arranged on one surface of said impervious sheet;

a second electrode unit consisting essentially of a plurality of second electrodes made from the conductive elongated materials and arranged on the other surface of said impervious sheet in a direction intersecting to said first electrodes;

an AC power source, having output terminals, for supplying an AC voltage, first electrode selective-switching means for selecting said first electrodes one by one, as a selected electrode, and for connecting said selected electrode to one of the output terminals of said AC power source;

second electrode selective-switching means for selecting and connecting two opposite outside electrodes in said second electrode unit to the output terminals of said AC power source, respectively, and for selecting, as a measuring electrode, each one of said second electrodes between said opposite outside electrodes one by one;

measuring means for measuring a potential of said measuring electrode to produce a measured potential;

phase-detecting means for detecting said measured potential by a signal synchronized with said AC voltage to produce a detected output signal; and processing means for processing said detected output signal to define as a position on a two-dimensional coordinate, an intersecting position of the selected electrode and the measuring electrode when said detected output signal is changed.

\* \* \* \* \*

UNITED STATES PATENT AND TRADEMARK OFFICE
CERTIFICATE OF CORRECTION

PATENT NO. : 5,540,085
DATED : July 30, 1996
INVENTOR(S) : Fumio Sakata et al.

It is certified that error appears in the above-indentified patent and that said Letters Patent is hereby corrected as shown below:

Column 3, line 40, "unite" should be --units--;

Column 7, equation (2) at line 12, there should be an equal sign (=) before the symbol "$V_o$";

equation (4) line 22, there should be an equal sign (=) between "$V_3$" and "$V_o$";

Column 7, equation (6), line 30, there should be an equal sign (=) between "$V_3$" and "$V_o$" of the equation;

Column 7, lines 50-53, delete "is phase detected";

Column 9, line 20, "Fig. 7R" should be --Fig. 7B--.

Signed and Sealed this

Sixth Day of May, 1997

*Attest:*

BRUCE LEHMAN

*Attesting Officer*  *Commissioner of Patents and Trademarks*